United States Patent [19]

Nakazawa et al.

[11] 4,395,739

[45] Jul. 26, 1983

[54] RECORDING/REPRODUCING APPARATUS WITH SELECTIVE ATTENUATION OF REPRODUCED SIGNALS TO FACILITATE COMPREHENSION OF EXTERNAL SPEECH SIGNALS

[75] Inventors: Tetsuji Nakazawa; Toshio Asai, both of Tokyo, Japan

[73] Assignee: Sony Corporation, Tokyo, Japan

[21] Appl. No.: 348,698

[22] Filed: Feb. 16, 1982

Related U.S. Application Data

[63] Continuation of Ser. No. 154,523, May 29, 1980.

[30] Foreign Application Priority Data

Jun. 21, 1979 [JP] Japan ................. 54-85225

[51] Int. Cl.³ .................. G11B 15/12; G11B 27/36
[52] U.S. Cl. ................... 360/61; 360/31; 360/67
[58] Field of Search .................. 360/31, 61, 62, 67, 360/68

[56] References Cited

U.S. PATENT DOCUMENTS

| | | |
|---|---|---|
| 1,760,021 | 5/1930 | Stone . |
| 2,986,140 | 7/1956 | Gardner et al. . |
| 3,283,251 | 11/1966 | Murphy ................. 360/61 |
| 3,373,508 | 3/1968 | Holden et al. ........... 360/61 |
| 3,403,232 | 9/1968 | Voyles et al. ........... 360/61 |
| 3,475,564 | 10/1969 | Lindgren et al. . |
| 3,617,647 | 11/1971 | Maier et al. . |
| 3,634,596 | 1/1972 | Rupert .................... 360/61 |
| 3,845,244 | 10/1974 | Yonezu . |
| 3,916,104 | 10/1975 | Anazawa . |
| 3,941,931 | 3/1976 | Osakabe . |
| 3,978,524 | 8/1976 | Gordon et al. . |
| 4,095,261 | 6/1978 | Rodriguez . |

FOREIGN PATENT DOCUMENTS

| | | |
|---|---|---|
| 2040267 | 2/1972 | Fed. Rep. of Germany . |
| 2541417 | 3/1977 | Fed. Rep. of Germany . |
| 2813000 | 10/1978 | Fed. Rep. of Germany . |
| 2840713 | 3/1980 | Fed. Rep. of Germany . |
| 799350 | 7/1958 | France . |
| 84878 | 12/1963 | France . |
| 54-131914 | 10/1979 | Japan . |
| 449711 | 4/1968 | Switzerland . |
| 710473 | 6/1954 | United Kingdom . |
| 1410771 | 10/1975 | United Kingdom . |
| 1477217 | 6/1977 | United Kingdom . |
| 1601447 | 10/1981 | United Kingdom . |

*Primary Examiner*—Vincent P. Canney
*Attorney, Agent, or Firm*—Lewis H. Eslinger; Alvin Sinderbrand

[57] ABSTRACT

Apparatus is provided wherein signals which are reproduced from a record medium and which are supplied to head-phones are selectively attenuated and, concurrently, audio electrical signals produced by a microphone are superimposed onto these attenuated signals. An attenuator is coupled between a record/playback transducer and an amplifier; and a switch exhibits a first condition to short-circuit the attenuator, and a second condition to enable the attenuator to attenuate the signals reproduced by the record/playback transducer and also to superimpose the audio electrical signals produced by the microphone onto the attenuated signals. In one embodiment, a record/reproduce selector selectively establishes either a recording mode, whereby the audio electrical signals produced by the microphone are amplified and supplied to the record/playback transducer, or a reproducing mode, whereby the signals reproduced from the record medium by the record/playback transducer are supplied to the amplifier.

22 Claims, 5 Drawing Figures

RECORDING/REPRODUCING APPARATUS WITH SELECTIVE ATTENUATION OF REPRODUCED SIGNALS TO FACILITATE COMPREHENSION OF EXTERNAL SPEECH SIGNALS

This is a continuation of application Ser. No. 154,523 filed May 29, 1980.

BACKGROUND OF THE INVENTION

This invention relates to recording and/or reproducing apparatus and, more particularly, to such apparatus which is portable and relatively small and, preferably, is used with headphones for audibly reproducing signals that are recovered from a record medium. Specifically, the present invention is directed to an arrangement for use with such apparatus whereby the signals that are recovered from the record medium are selectively attenuated so that external signals, such as may be produced by a microphone, are superimposed onto the attenuated signals, are reproduced by the head-phones, and are easily comprehended by the listener.

In signal reproducing apparatus, such as portable magnetic tape playback devices, or central magnetic tape playback devices, head-phones may be provided to enable one or more listeners to listen to a reproduced audio program. While listening to this program, if a listener wishes to converse with another individual, he may not readily comprehend what is being said. If the listener does not remove his head-phones, the reproduced audio program interferes with his comprehension, and there is a tendency for the listener to raise his voice when attempting to converse with the other individual.

This problem is further pronounced if two listeners, both listening to reproduced audio programs via head-phones, attempt to converse with each other. Also, if the listener is listening to musical selections and wishes to sing along therewith, he often will shout in order to produce loud enough speech signals that he can perceive.

It is believed that the aforenoted problems can be overcome if the listener is provided with a control arrangement whereby the reproduced audio program is selectively attenuated.

OBJECTS OF THE INVENTION

Therefore, it is an object of the present invention to provide improved recording and/or reproducing apparatus which overcomes the aforenoted problems.

Another object of this invention is to provide apparatus for use with a signal reproducing device wherein signals which are reproduced from a record medium are selectively attenuated, and external audio signals, such as may be produced by a microphone, are superimposed onto the attenuated signals, the superimposed signals both being supplied to head-phones.

A further object of this invention is to provide apparatus for reproducing signals from a record medium, and for supplying those signals to head-phones; and to enable a listener to converse with another, even while such signals are reproduced.

An additional object of this invention is to provide apparatus for use with a signal reproducing device of the type which normally is provided with head-phones and a microphone, wherein signals which are reproduced from a record medium and transduced by the head-phones are attenuated and superimposed with external signals introduced via the microphone, whereby the listener may listen to the reproduced signals and, simultaneously, carry on an intelligible conversation with another.

Yet another object of this invention is to provide portable, small recording/reproducing apparatus having head-phone jacks that permit two listeners to listen to pre-recorded material, and an integrally-formed microphone; whereby each listener may listen to the pre-recorded material, may carry on a conversation with the other by speaking into the microphone, and may selectively record his own voice signals.

Various other objects, advantages and features of the present invention will become readily apparent from the ensuing detailed description, and the novel features will be particularly pointed out in the appended claims.

SUMMARY OF THE INVENTION

In accordance with this invention, reproducing or recording/reproducing apparatus is provided, having a playback head for reproducing signals from a record medium, an amplifier for amplifying those reproduced signals, a head-phone jack connection coupled to the amplifier for receiving the amplified reproduced signals, and a microphone. An attenuator is adapted to selectively attenuate the signals which are reproduced by the playback head. A switching circuit is capable of being selectively disposed in a first condition such that the attenuator is by-passed, whereby the reproduced signals are supplied from the playback head to the amplifier without passing through the attenuator, and in a second condition which effectively connects the attenuator in circuit between the playback head and the amplifier and, additionally, connects the microphone to the input of the amplifier, whereby audio signals which are produced by the microphone are superimposed onto attenuated reproduced signals. In this second condition, if head-phones are connected to the head-phone jack connection, a listener may carry on a conversation via the microphone while listening to background material reproduced from the record medium.

In another embodiment of the present invention, the playback head is formed as a combination record/playback had; and an additional switching arrangement is provided such that audio signals which are produced from the microphone may be selectively recorded on the record medium by the record/playback head. In this alternative embodiment, the user of the apparatus may listen to pre-recorded material, may listen to such material as background material while concurrently carrying on a conversation, or may use the apparatus to record his own voice signals to which he may additionally listen via head-phones.

BRIEF DESCRIPTION OF THE DRAWINGS

The following detailed description, given by way of example, will best be understood in conjunction with the accompanying drawings in which.

DETAILED DESCRIPTION OF PREFERRED EMBODIMENTS

Figure 1:
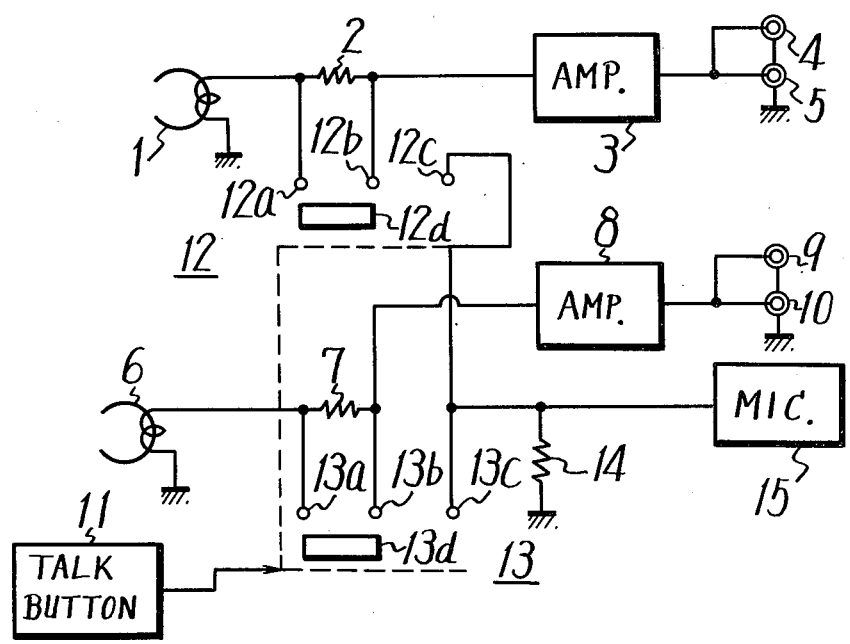
FIG. 1 is a partial block, partial schematic diagram of one embodiment of the present invention.

Referring now to the drawings, wherein like reference numerals are used throughout, and in particular to FIG. 1, there is illustrated one embodiment of the present invention in partial block, partial schematic form. In this embodiment, audio signals which are previously recorded on a record medium are capable of being reproduced therefrom, which audio signals may be perceived by a listener provided with conventional headphones. For the purpose of the present description, it will be assumed that the record medium is comprised of magnetic tape. However, it should be readily appreciated that other conventional recording media may be used in conjunction with the teachings of the present invention.

The embodiment of FIG. 1 is comprised of reproducing transducers 1 and 6, amplifiers 3 and 8 and headphone jacks 4, 9 and 5, 10. It will be appreciated that this embodiment is adapted to reproduce stereophonic signals from the magnetic tape, separate channels of such signals being reproduced by transducers 1 and 6, respectively. These transducers may comprise conventional playback heads of a type known to those of ordinary skill in the art. For convenience, playback head 1 may reproduce the left-channel signals from the magnetic tape, and playback head 6 may reproduce the right-channel signals therefrom. Playback head 1 is coupled to amplifier 3 via a circuit to be described in detail below. Likewise, playback head 6 is coupled to amplifier 8 via a similar circuit. As will be described, amplifiers 3 and 8 serve to amplify the left-channel and right-channel signals, respectively, reproduced by playback heads 1 and 6. The output of amplifier 3 is coupled in common to head-phone jacks 4 and 5; and the output of amplifier 8 is coupled in common to head-phone jacks 9 and 10. In this embodiment, two pairs of head-phones may be used by two listeners for listening to the material which is reproduced by playback heads 1 and 6. Thus, head-phone jack 4 may be considered to be the left-channel jack and head-phone jack 9 may be considered to be the right-channel jack. One listener would insert his head-phone connectors into jacks 4 and 9 so as to receive the left-channel and right-channel signals, respectively. Similarly, head-phone jack 5 may be considered to be the left-channel jack and head-phone jack 10 may be considered to be the right-channel jack. Another listener would insert his head-phone connectors into jacks 5 and 10, respectively, so as to receive the left-channel and right-channel signals. Thus, jacks 4 and 9 constitute one pair of head-phone jacks to which one pair of head-phones is connected; and jacks 5 and 10 constitute a second pair of head-phone jacks to which another pair of head-phones is connected.

In the embodiment of FIG. 1, the signals which are reproduced from the record medium by playback heads 1 and 6 are supplied selectively to amplifiers 3 and 8 by respective attenuators. These attenuators are formed as resistive voltage divider circuits and, more particularly, a left-channel attenuator is comprised of a resistor 2, connected in series circuit between playback head 1 and amplifier 3, and a resistor 14 connectable in shunt relationship with the input of amplifier 3. Likewise, the right-channel attenuator is comprised of a resistor 7 connected in series circuit between playback head 6 and amplifier 8, and resistor 14 connectable in shunt relationship with the input of amplifier 8. Switching circuits 12 and 13 are operable to selectively by-pass the attenuators, or to effectively connect such attenuators in circuit so as to attenuate the signals which are reproduced by the playback heads.

Switching circuit 12 is comprised of fixed terminals, or contacts, 12a, 12b and 12c and a movable element, or contact, 12d. Terminal 12a is connected to one end of resistor 2 and terminal 12b is connected to the opposite end of this resistor. Terminal 12c is connected to one end of resistor 14, the other end of which is coupled to a reference potential, such as ground. Movable element 12d may be disposed in a first or second position. In the first position thereof, movable element 12d interconnects terminals 12a and 12b so as to provide a short-circuit by-pass across resistor 2. In its second position, movable element 12d interconnects terminals 12b and 12c, so as to couple resistor 14 to the junction defined by resistor 2 and the input of amplifier 3. Thus, in its first position, resistor 14 is not connected either to resistor 2 or to amplifier 3 and, moreover, resistor 2 is short-circuited. In the second position of switching circuit 12, resistor 2 no longer is short-circuited and, additionally, resistor 14 is connected thereto so as to form a voltage divider. It is appreciated that, when movable element 12d is disposed in its second position, resistors 2 and 14 form a voltage divider circuit having a voltage divider ratio equal to the resistance of resistor 14 divided by the sum of the resistances of resistors 2 and 14. This voltage divider ratio serves to attenuate the signals which are reproduced from the record medium by playback head 1. Such attenuated signals are supplied to amplifier 3.

Switching circuit 13 exhibits a similar construction as that of switching circuit 12 and is comprised of fixed terminals, or contacts, 13a, 13b and 13c, and a movable element, or contact 13d. Terminals 13a and 13b are connected to the opposite ends of resistor 7, and terminal 13c is connected in common with terminal 12c to resistor 14. Movable element 13d is capable of being disposed in a first position so as to interconnect terminals 13a and 13b, and thus short-circuit or by-pass resistor 7. This movable element also is capable of being disposed in a second position which interconnects terminals 13b and 13c, so as to remove the short-circuit by-pass of resistor 7 and, moreover, to connect resistor 14 to the junction defined by resistor 7 and the input of amplifier 8. Thus, when movable element 13d is disposed in its first position, the attenuator formed of voltage-divider resistors 7 and 14 is by-passed, and when this movable element is disposed in its second position, resistors 7 and 14 are effectively connected to each other to form the voltage-divider attenuator circuit at the input of amplifier 8.

It is appreciated that, if the resistances of resistors 2 and 7 are equal, then the attenuation of the signals which are reproduced by playback heads 1 and 6 when movable elements 12d and 13d both are disposed in their second positions, is equal.

Preferably, movable elements 12d and 13d are mechanically coupled to an actuator 11, referred to herein as a talk button, such that both movable elements are simultaneously movable between their first and second positions. Talk button 11 is manually operable by the user of the apparatus. This talk button thus establishes a first condition for switching circuits 12 and 13, whereby movable elements 12d and 13d exhibit their first positions, and the talk button also establishes a second condition for the switching circuits, whereby both movable elements are disposed in their second positions. A spring bias arrangement (not shown) may be used to bias movable elements 12d and 13d normally in their first positions. When talk button 11 is operated, such as when the actuator is depressed, the movable elements are driven to their second positions. When the talk button is released, the spring bias force exerted thereon returns movable elements 12d and 13d to their first positions.

The apparatus of FIG. 1 also is provided with a microphone 15 whose output is coupled to the junction defined by terminals 12c and 13c and resistor 14. Microphone 15 preferably is integrally formed with the apparatus, as will be described below with respect to FIG. 2. When an individual speaks into this microphone, corresponding audio electrical signals are produced thereby. It is appreciated that, when switching circuits 12 and 13 exhibit their first conditions, such audio electrical signals are not utilized. However, when these switching circuits exhibit their second conditions, the audio electrical signals produced by microphone 15 appear across resistor 14 and are coupled, via movable elements 12d and 13d, to the inputs of amplifiers 3 and 8, respectively.

In operation, a pair of head-phones may be connected by the listener across head-phone jacks 4 and 9. If desired, another pair of head-phones may be connected by another user between head-phone jacks 5 and 10. Thus, one or both listeners may listen to the material which is reproduced from the record medium by playback heads 1 and 6. Typically, such reproduced material may be music. For best perception of this material, switching circuits 12 and 13 exhibit their first conditions, whereby movable elements 12d and 13d are disposed in their first positions. Consequently, resistors 2 and 7 are by-passed such that the signals reproduced from the record medium by playback heads 1 and 6 are supplied to amplifiers 3 and 8, respectively. More particularly, the signals reproduced by playback head 1 are supplied therefrom to terminal 12a, then through movable element 12d to terminal 12b and thence to the input of amplifier 3. Likewise, the signals reproduced by playback head 6 are supplied to terminal 13a and then through element 13d to terminal 13b and thence to amplifier 8. These unattenuated signals are amplified by the respective amplifiers, and supplied to the head-phone jacks, whereby head-phones which are connected to such jacks reproduce audible material for the listener.

If a conversation is to be carried on by the listener with another individual while switching circuits 12 and 13 exhibit their first conditions, as discussed above, it is appreciated that the reproduced audible signals will interfere with such conversation. To overcome this interference, the listener will have a tendency to shout in order to continue with his conversation. If two listeners attempt to converse with each other, this tendency is increased because both will shout. This disadvantage is overcome if talk button 11 is operated so as to change over switching circuits 12 and 13 to their second conditions. In the second condition, movable element 12d is disposed in its second position and, similarly, movable element 13d is disposed in its second position. In the second positions thereof, resistor 14 is connected in voltage-dividing relationship with each of resistors 2 and 7. Furthermore, the short-circuit by-passes of resistors 2 and 7, which had been attained when movable elements 12d and 13d were in their first positions now are removed. Thus, the left-channel signals reproduced by playback head 1 are attenuated by the resistive voltage-divider formed of resistors 2 and 14, and these attenuated signals are supplied to amplifier 3. Likewise, the right-channel signals reproduced by playback head 6 are attenuated by the resistive voltage-divider circuit formed of resistors 7 and 14, and these attenuated signals are supplied to amplifier 8. Accordingly, the head-phones which are connected to the illustrated head-phone jacks are supplied with attenuated signals so as to produce audible signals of lower volume. Furthermore, if the conversation between the listener and the other individual, or between the two listeners, is carried on by speaking into microphone 15, it is appreciated that, when switching circuits 12 and 13 exhibit their second conditions, the audio electrical signals produced by this microphone are superimposed onto the attenuated left-channel and right-channel signal and applied to amplifiers 3 and 8, respectively. Consequently, the head-phones which are connected to the head-phone jacks reproduce speech signals having a sufficient volume so as to be readily understood. The material, such as music, which is reproduced from the record medium by playback heads 1 and 6, is perceived as background music and does not interfere with the conversation. Hence, the listener now readily perceives his own voice signals, which are detected via his head-phones, as well as the voice signals produced by the other individual.

Thus, in the embodiment shown in FIG. 1, a single record medium, such as a single magnetic tape, having prerecorded material thereon, such as music, may be listened to simultaneously by two listeners. The sound intensity of the pre-recorded material is attenuated, by operating talk button 11 so as to change over switching circuits 12 and 13 from their first conditions to their second conditions, and a conversation now may be carried on between such listeners merely by speaking into microphone 15. Of course, this apparatus may be used by only a single listener, enabling him to carry on a conversation with another individual without removing his head-phones, while permitting him to perceive that conversation readily and without undesired interference due to the reproduced material.

Another advantageous use of this apparatus enables a listener to attenuate background music such that he may sing along with that music and easily detect his own voice.

The attenuating ratio of the reproduced signals is determined by the voltage-divider ratio of the illustrated resistors. Preferably, the voltage-divider ratio in the left-channel is equal to that of the right-channel. However, different ratios may be used, if desired. Also, resistor 14 may be adjustable so as to enable the listener to increase or decrease the attenuating ratio as he may select.

Figure 2:
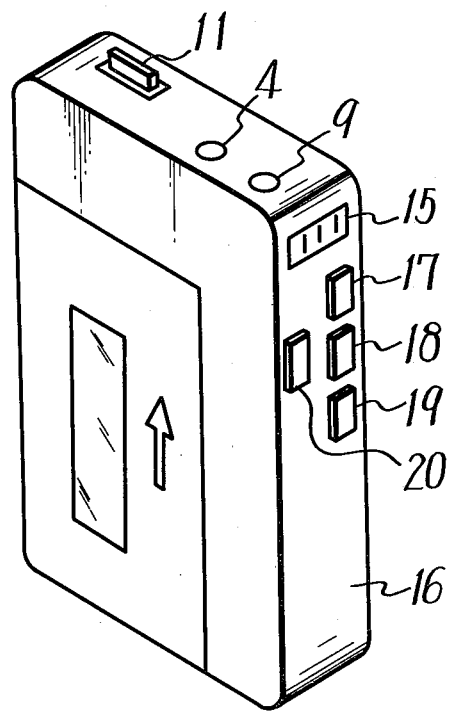
FIG. 2 is a perspective view of one embodiment of apparatus in which the present invention is incorporated.

A perspective view of one example of apparatus with which the embodiment shown in FIG. 1 may be utilized is illustrated in FIG. 2. This example illustrates a small, portable magnetic tape reproducing device. Such a device may be carried by an individual for "personal" use or may be provided in a vehicle, such as an automobile, airplane, or the like. Typically, this device is comprised of a housing 16 which contains a suitable tape transport mechanism (not shown), as well as the electrical circuitry of FIG. 1. Housing 16 is provided with head-phone jacks 4 and 9, talk button 11 and microphone 15. It is seen that, in this example, the microphone is integrally constructed with the apparatus. If desired, additional head-phone jacks 5 and 10 also may be provided. As mentioned above, one pair of head-phones may be connected, by conventional head-phone plug connectors, across jacks 4 and 9.

To facilitate conventional operation of the tape reproducing apparatus, housing 16 also is provided with typical fast-forward push-button 17, rewind push-button 18, play push-button 19 and stop push-button 20. These push-buttons are of conventional construction and enable an operator to carry out typical fast-forward, rewind, play and stop operations. These operations are well known to those of ordinary skill in the art and, therefore, further description thereof need not be provided.

It is appreciated that, if head-phones are connected across jacks 4 and 9, and if play push-button 19 is operated, the previously recorded material on the magnetic tape is reproduced and listened to by the listener via the head-phones. To carry on a conversation, the listener operates talk button 11, which has the resultant operation discussed hereinabove with respect to the embodiment of FIG. 1. Microphone 15 is used to pick up speech signals of both the listener and the individual with which he is conversing. As discussed above, these speech signals are superimposed onto the attenuated signals which are reproduced from the magnetic tape, and these superimposed signals are supplied to the headphones.

Figure 3:
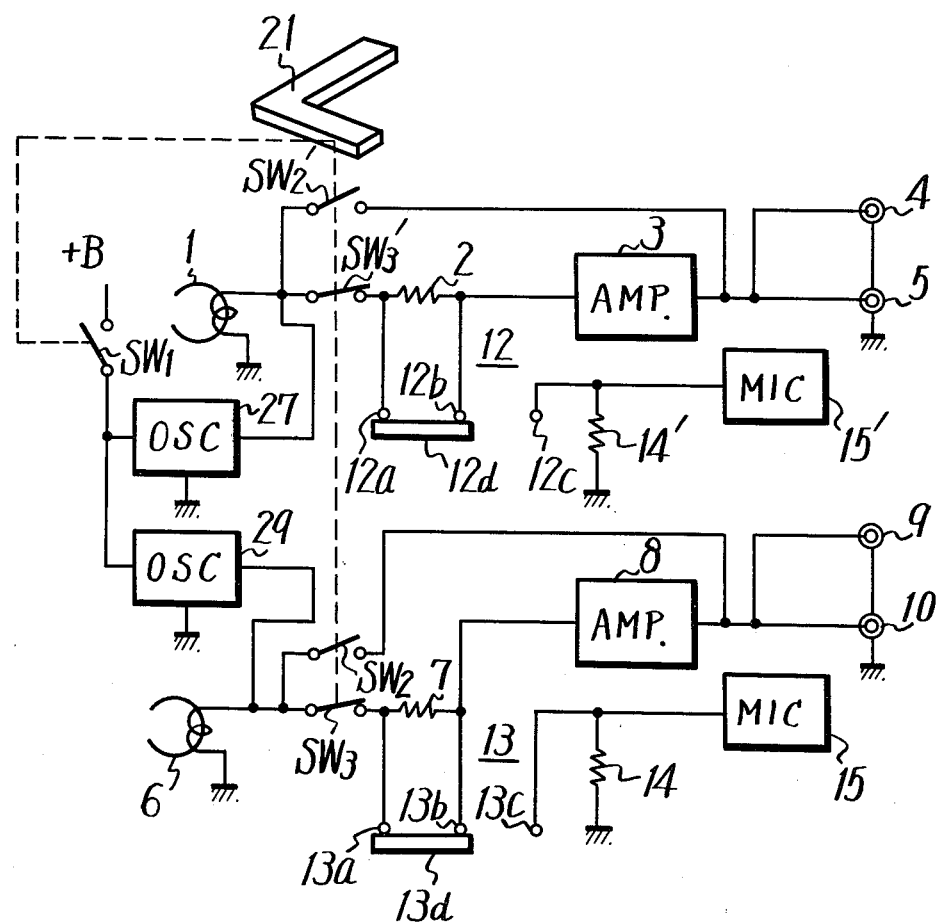
FIGS. 3 and 4 are partial block, partial schematic diagrams of another embodiment of the present invention.
Figure 4:
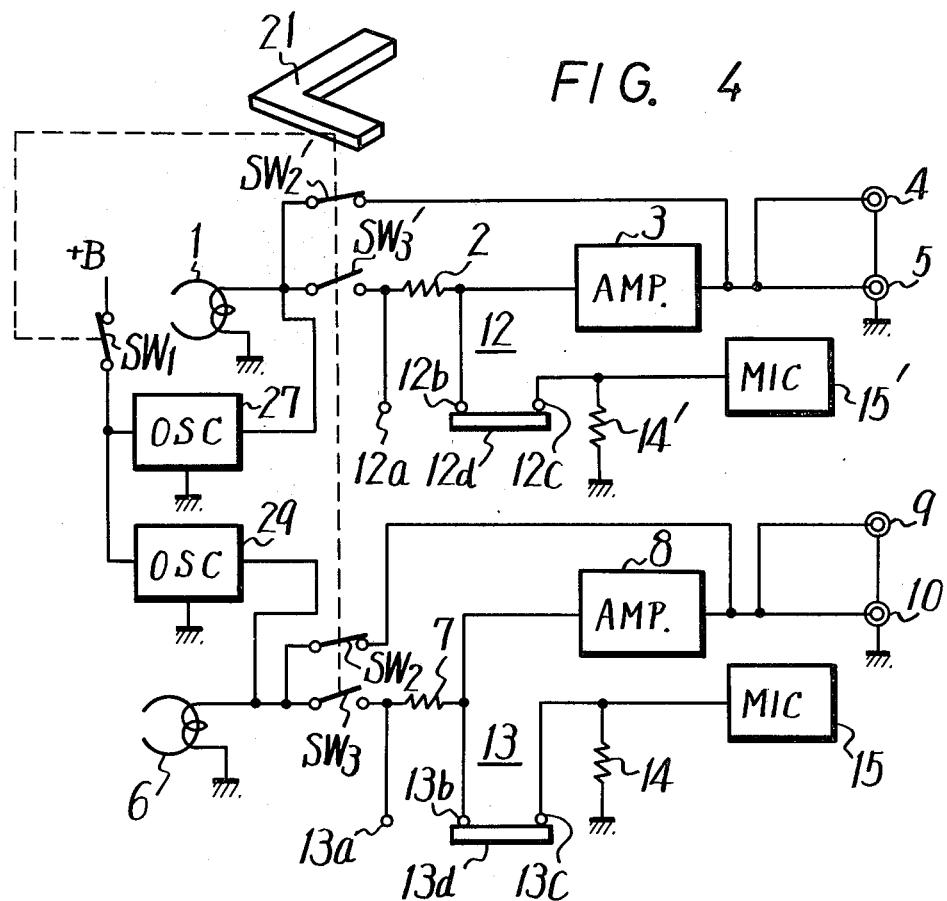
Figure 5:
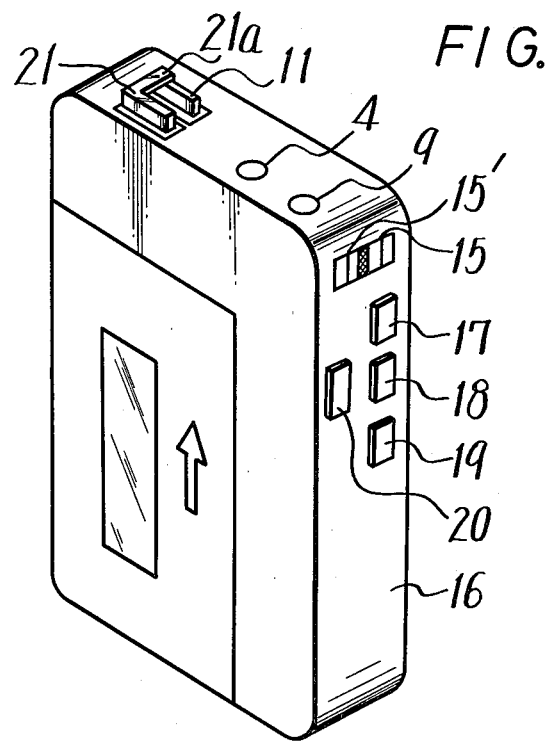
FIG. 5 is a perspective view of apparatus in which the embodiment of FIGS. 3 and 4 may be incorporated.

Referring now to the embodiment shown in FIGS. 3, 4 and 5, it is seen that this embodiment is similar to that described above with respect to FIGS. 1 and 2. In the embodiment now described, the reproducing device functions as a recording and/or reproducing device. This dual capability is provided by a record/reproduce selector switching arrangement comprised of switches $SW_1$, $SW_2$, $SW'_2$, $SW_3$ and $SW'_3$. Also, bias oscillators 27 and 29 are connected to transducers 1 and 6, respectively, for supplying typical AC bias signals thereto.

In the embodiment of FIGS. 3–5, transducers 1 and 6 are constructed as conventional record/playback heads and are adapted to record signals on as well as reproduce signals from the record medium. In the absence of an AC bias signal supplied thereto, each head serves to reproduce signals from the record medium.

Bias oscillators 27 and 29 are connected in common through switch $SW_1$ to a suitable source of operating potential +B. When this switch is closed, the operating potential supplied to oscillators 27 and 29 energize these oscillators to apply the AC bias signal generated thereby to heads 1 and 6, respectively. When switch $SW_1$ is opened, the oscillators are not energized, and the AC bias signal is not generated and, thus, not supplied to the heads.

Head 1 is selectively coupled to the input of amplifier 3 via switch $SW'_3$, and head 6 is selectively coupled to the input of amplifier 8 via switch $SW_3$. Thus, when switches $SW'_3$ and $SW_3$ both are closed, the left-channel and right-channel signals reproduced from the record medium by heads 1 and 6 can be supplied to amplifiers 3 and 8, respectively. When these switches are opened, any signals that may be reproduced by these heads are inhibited from being supplied to the amplifiers.

The output of amplifier 3 is selectively coupled to head 1 via switch $SW'_2$, and the output of amplifier 8 likewise is selectively coupled to head 6 via switch $SW_2$. When switches $SW'_2$ and $SW_2$ both are closed, the amplified signals produced by amplifiers 3 and 8 are supplied to heads 1 and 6, respectively. However, when these switches are opened, the amplified signals are inhibited from being supplied to these heads.

In the embodiment of FIGS. 3–5, stereophonic left-channel and right-channel signals are reproduced from the record medium by heads 1 and 6. Also, the apparatus is selectively operated to record left-channel and right-channel stereophonic signals by these heads. To effect such stereophonic signal recording, separate microphones 15' and 15 are provided for the left-channel and right-channel signals, respectively. Microphone 15' is coupled to terminal 12c of switching circuit 12. Similarly, microphone 15 is coupled to terminal 13c of switching circuit 13. To maintain independence of the left-channel and right-channel signals during recording and reproduction, separate resistors 14' and 14 are connected between ground and each of terminals 12c and 13c, respectively.

Referring to FIG. 5, it is seen that separate microphones 15' and 15 are integrally formed with the illustrated recording/reproducing device. Furthermore, in addition to talk button 11, described above with respect to the embodiments of FIGS. 1–2, a record push-button actuator 21 also is provided. This record push-button actuator is illustrated as an L-shaped member having a leg 21a which overlies talk button 11 such that when record push-button actuator 21 is depressed, leg 21a depresses talk button 11. However, the operator may manually depress the talk button without concurrently depressing the record push-button actuator.

In operation, switches $SW_1$, $SW_2$, $SW'_2$, $SW_3$ and $SW'_3$ normally exhibit their respective conditions illustrated in FIG. 3. That is, if record push-button actuator 21 is not depressed, the apparatus operates as a signal reproducing device, whereby switch $SW_1$ is opened to inhibit AC bias signals from being supplied to heads 1 and 6, switches $SW'_3$ and $SW_3$ are closed to enable signals reproduced by these heads to be coupled to amplifiers 3 and 8, and switches $SW'_2$ and $SW_2$ are opened to prevent amplified signals from being supplied to the heads. Now, if talk button 11 is not operated, movable elements 12d and 13d are disposed in their first positions, as illustrated in FIG. 3, so as to short-circuit resistors 2 and 7, respectively. Hence, left-channel and right-channel signals which are reproduced from the record medium by heads 1 and 6 are supplied via switches $SW'_3$ and $SW_3$, through movable elements 12d and 13d to amplifiers 3 and 8, respectively. If head-phones are connected across head-phone jacks 4 and 9, audible signals corresponding to the reproduced material are perceived. As in the previously described embodiment, two sets of head-phone jacks are provided so as to enable two pairs of head-phones to be connected, whereby two listeners may listen to the pre-recorded material.

If talk button 11 is operated, movable elements 12d and 13d are changed over to their second positions so as to remove the short-circuit by-passes of resistors 2 and 7. Resistor 2 now is connected in voltage-divider relationship with resistor 14'; and resistor 7 now is connected in voltage-divider relationship with resistor 14. Thus, the left-channel and right-channel signals are attenuated, in accordance with the voltage-divider ratio established by these respective voltage-divider circuits. The attenuated signals are supplied to amplifiers 3 and 8, and the listener now perceives attenuated audible signals. A conversation now may be carried on by speaking into microphones 15 and 15''. The audio electrical signals produced by these microphones are supplied to amplifiers 3 and 8 by movable elements 12d and 13d, respectively, so as to be superimposed onto the attenuated left-channel and right-channel signals. It is appreciated that this operation is substantially identical to that described above with respect to the embodiment of FIGS. 1-2.

In addition to carrying on a conversation while listening to attenuated, background material, the user of the apparatus illustrated in FIGS. 3-5 may record his own voice signals. This recording mode of operation is established by depressing record push-button actuator 21. When this actuator is depressed, the switches $SW_1$, $SW_2$, $SW'_2$, $SW_3$ and $SW'_3$ are disposed in the conditions illustrated in FIG. 4. More particularly, switch $SW_1$ is closed so as to supply energizing potential to oscillators 27 and 29. Consequently, the AC bias signals generated by these oscillators are applied to heads 1 and 6, thereby conditioning such heads to function as recording heads. Also, switches $SW'_3$ and $SW_3$ are opened so as to inhibit any signals that may be supplied to heads 1 and 6, or any signals that may be reproduced by these heads, from being applied to the inputs of amplifiers 3 and 8. Furthermore, switches $SW'_2$ and $SW_2$ are closed so as to connect the outputs of amplifiers 3 and 8 to heads 1 and 6, respectively. It should also be appreciated that, when record push-button actuator 21 is depressed, talk button 11 likewise is operated. Consequently, movable elements 12d and 13d are disposed in their second positions so as to connect microphones 15' and 15 therethrough to the inputs of amplifiers 3 and 8, respectively. Now, if speech signals are supplied into microphones 15' and 15, the audio electrical signals produced by these microphones are supplied via movable elements 12d and 13d to the inputs of amplifiers 3 and 8, respectively. Such audio electrical signals are amplified and then supplied from amplifiers 3 and 8 through switches $SW'_2$ and $SW_2$ to heads 1 and 6, respectively. These heads also are supplied with AC bias signals, and serve to record the audio electrical signals on the record medium.

In addition to recording these signals, the amplified audio electrical signals are supplied to the head-phone jacks, whereby the listener may listen to his speech signals as they are recorded.

While the present invention has been particularly shown and described with reference to preferred embodiments thereof, it should be readily apparent that various changes and modifications in form and details may be made without departing from the spirit and scope of the invention. For example, the present invention is equally applicable to single-channel recording-/reproducing devices. For example, in the FIG. 1 embodiment, a single reproducing head may be provided, and either the left-channel or right-channel circuitry may be omitted. Similarly, in the embodiment of FIGS. 3-5, either the left-channel or the right-channel circuitry may be omitted, if desired. As another example, switching circuits 12 and 13 may be comprised of other elements to effect the selective attenuation of reproduced signals as well as the selective coupling of the microphone to the amplifiers. It also should be appreciated that additional stages of amplification and filtering may be provided in each channel, although in the interest of simplification, such additional circuitry is now shown.

It is intended that the appended claims be interpreted as including the foregoing as well as various other changes and modifications.

What is claimed is:

1. Apparatus for reproducing signals from a record medium, comprising transducer means for reproducing said signals; amplifier means for amplifying said reproduced signals; head-phone jack means coupled to said amplifier means for receiving said amplified reproduced signals and, when head-phone means are connected thereto, for supplying said amplified reproduced signals to said head-phone means to enable a listener to listen to said reproduced signals; microphone means for producing audio electrical signals; attenuator means for selectively attenuating the signals reproduced by said transducer means; and switch means selectively operative to facilitate conversation between said listener and another, said switch means having a first condition, whereby said reproduced signals are supplied from said transducer means to said amplifier means without passing through said attenuator means, and a second condition, whereby said reproduced signals are supplied to said amplifier means through said attenuator means and, additionally, said audio electrical signals are supplied from said microphone means to said amplifier means.

2. The apparatus of claim 1 wherein said attenuator means comprises resistive voltage divider means.

3. The apparatus of claim 2 wherein said switch means comprises movable element means disposed in short-circuiting relationship with said resistive voltage divider means when said switch means exhibits said first condition.

4. The apparatus of claim 2 wherein said resistive voltage divider means includes at least a first resistor connected in series circuit between said transducer means and said amplifier means and a second resistor connectable in shunt relationship with the input of said amplifier means; and wherein said switch means comprises a pair of fixed terminals coupled to opposite ends of said first resistor, a third fixed terminal coupled to one end of said second resistor, and a movable contact connected across said pair of fixed terminals when said switch means exhibits said first condition to short-circuit said first resistor and supply said reproduced signals to said input of said amplifier means, and connected across one of said pair of fixed terminals and said third fixed terminal when said switch means exhibits said second condition to connect said second resistor in shunt relationship with said input of said amplifier means.

5. The apparatus of claim 4 wherein said microphone means is coupled to said third fixed terminal such that said audio electrical signals are supplied to said third fixed terminal and thence to said input of said amplifier means when said switch means exhibits said second condition.

6. The apparatus of claim 2 wherein said transducer means comprises left-channel and right-channel playback heads for reproducing stereophonic left-channel and right-channel signals, respectively, from said record medium; said amplifier means comprises left-channel and right-channel amplifiers for amplifying said left-channel and right-channel signals, respectively; said head-phone jack means comprises left-channel and right-channel jacks coupled to said left-channel and right-channel amplifiers, respectively; said attenuator means comprises left-channel and right-channel attenuators for selectively attenuating the left-channel and right-channel signals, respectively; and said switch means comprises left-channel and right-channel switches, each having a first condition in which said left-channel and right-channel signals are respectively supplied thereby from said left-channel and right-channel playback heads to said left-channel and right-channel amplifiers without passing through said left-channel and right-channel attenuators, respectively, and each having a second condition in which said left-channel and right-channel signals are respectively supplied to said left-channel and right-channel amplifiers through said left-channel and right-channel attenuators, respectively and, additionally, in which said audio electrical signals are supplied from said microphone means to at least one of said left-channel and right-channel amplifiers.

7. Portable, self-contained, small reproducing apparatus for reproducing stereophonic signals from a magnetic tape, comprising:
a pair of playback heads for reproducing said stereophonic signals from said magnetic tape;
a pair of amplifiers for amplifying said reproduced stereophonic signals;
a pair of head-phone jack connector means coupled to said pair of amplifiers for receiving said amplified reproduced stereophonic signals and, when head-phones are connected thereto, for supplying said amplified reproduced stereophonic signals to said head-phones;
microphone means, integral with said reproducing apparatus, for producing audio electrical signals;
attenuator means for selectively attenuating the stereophonic signals reproduced by said playback heads;
a pair of switches, each having a first condition in which a respective one of said reproduced stereophonic signals is supplied from one of said playback heads to one of said amplifiers without passing through said attenuator means, and a second condition in which said respective one of said reproduced stereophonic signals is supplied to said one amplifier through said attenuator means and, additionally, said audio electrical signals are supplied from said microphone means to said one amplifier; and
an actuator manually operable to dispose both of said switches selectively in their first or second conditions.

8. The apparatus of claim 7 wherein said attenuator means comprises a pair of resistive voltage divider circuits having a common resistor coupled to a reference potential, each of said resistive voltage divider circuits further having a series-connected resistor connected in series between a respective one of said playback heads and a respective one of said amplifiers.

9. The apparatus of claim 8 wherein each of said switches comprises a first contact connected to one end of a respective one of said series-connected resistors, a second contact connected to the other end of said respective one of said series-connected resistors, a third contact connected to one end of said common resistor, and a movable shorting element interconnected between said first and second contacts when said actuator disposes said switches in said first condition and interconnected between said second and third contacts when said actuator disposes said switches in said second condition.

10. The apparatus of claim 9 wherein said microphone means is connected in common to the third contacts of both of said switches.

11. In small, portable signal reproducing apparatus having plural playback heads for reproducing signals from a record medium; plural amplifiers for amplifying the signals reproduced by respective ones of said plural playback heads; head-phone jack connector means coupled to said plural amplifiers for receiving the signals amplified by respective ones of said amplifiers and, when head-phones are connected thereto, for supplying said amplified signals to said head-phones; and a microphone integral with said signal reproducing apparatus for producing audio electrical signals, the improvement comprising:
a plurality of attenuators, each connected in series circuit between a respective one of said playback heads and a respective one of said amplifiers for attenuating the signals reproduced by said respective playback head;
a plurality of switches, each coupled to a respective one of said attenuators and to said microphone, and each having a first condition for by-passing said respective attenuator such that the signals reproduced by a respective playback head are supplied to a respective amplifier without passing through said attenuator and a second condition for effectively connecting said respective attenuator in said series circuit and also for connecting said microphone to said respective amplifier whereby said audio electrical signals are supplied to said amplifier; and
an actuator manually operable to concurrently dispose said plurality of switches selectively in either said first or second condition.

12. Apparatus for recording and for reproducing signals on a record medium, comprising transducer means for selectively recording signals on said record medium or reproducing signals from said record medium; amplifier means for selectively amplifying the signals to be recorded on or the signals reproduced from said record medium; head-phone jack means coupled to said amplifier means for receiving the amplified signals therefrom and, when head-phone means are connected thereto, for supplying said amplified signals to said head-phone means; microphone means for producing audio electrical signals; attenuator means for selectively attenuating the signals reproduced by said transducer means; switch means having a first condition, whereby said transducer means reproduces signals from said record medium and said reproduced signals are supplied to said amplifier means without passing through said attenuator means, and a second condition, whereby said reproduced signals are supplied to said amplifier means through said attenuator means and additionally, said audio electrical signals are supplied from said microphone means to said amplifier means; and record/reproduce selector means selectively operable to inhibit signals from said transducer means to be supplied to said amplifier means while, at the same time, supplying amplified signals from said amplifier means to said transducer means for recording.

13. The apparatus of claim 12 wherein said record/reproduce selector means comprises a first switching arrangement having a first state for connecting said transducer means to the input of said amplifier means and a second state for disconnecting said transducer means from said input of said amplifier means, and a second switching arrangement having a first state for disconnecting the output of said amplifier means from said transducer means and a second state for connecting said output of said amplifier means to said transducer means.

14. The apparatus of claim 13 further comprising an actuator selectively operable to dispose said switch means in said first condition and concurrently dispose said first and second switching arrangements in said first state, or to dispose said switch means in said second condition and concurrently dispose said first and second switching arrangements in said second state.

15. The apparatus of claim 14 wherein said transducer means comprise a pair of record/playback heads, each operative to record signals on and reproduce signals from said record medium; said amplifier means comprise a pair of amplifiers, each operative to selectively amplify the signals recorded and reproduced by a respective one of said record/playback heads; said head-phone jack means comprise a pair of head-phone connection means, each head-phone connection means being coupled to a respective one of said amplifiers; said attenuator means comprise a pair of attenuators, each operative to selectively attenuate the signals reproduced by a respective one of said record/playback heads; said switch means comprise a pair of switches, each having a first condition in which the signals reproduced by a respective one of said record/playback heads are supplied to a respective one of said amplifiers without passing through a respective one of said attenuators, and a second condition in which the signals reproduced by said respective record/playback head are supplied through said respective attenuator to said respective amplifier and additionally said audio electrical signals are supplied from said microphone means to said respective amplifier; said first switching arrangement comprises a pair of first switching elements, each selectively supplying the signals reproduced from a respective one of said record/playback heads to a respective one of said amplifiers; and said second switching arrangement comprises a pair of second switching elements, each selectively supplying the audio electrical signals amplified by a respective one of said amplifiers to a respective one of said record/playback heads for recording on said record medium.

16. The apparatus of claim 15 wherein said microphone means comprise a pair of microphones, each producing audio electrical signals selectively coupled to a respective one of said amplifiers.

17. The apparatus of claim 16 wherein each of said switches comprises a movable contact connected to by-pass a respective one of said attenuators when said switch exhibits said first condition so as to supply the signals reproduced by a respective one of said record/playback heads directly to a respective one of said amplifiers, and connected to said respective attenuator and also to a respective one of said microphones when said switch exhibits said second condition so as to supply the signals reproduced by said respective record/playback head to said respective amplifier through said respective attenuator and also to supply the audio electrical signals produced by said respective microphone to said respective amplifier.

18. In small, portable signal recording/reproducing apparatus having plural record/playback heads for selectively recording signals on and reproducing signals from a record medium; plural amplifiers for amplifying the signals to be recorded and the signals reproduced by respective ones of said record/playback heads; head-phone jack connector means coupled to said plural amplifiers for receiving the signals amplified by respective ones of said amplifiers and, when head-phones are connected thereto, for supplying said amplified signals to said head-phones; microphone means integral with said signal record/reproducing apparatus for producing audio electrical signals; and a switching arrangement having a first state in which said apparatus operates to reproduce signals from said record medium and a second state in which said apparatus operates to record the audio electrical signals produced by said microphone means on said record medium, the improvement comprising:

a plurality of attenuators, each connected in series circuit between a respective one of said record/playback heads and a respective one of said amplifiers for attenuating the signals reproduced by said respective heads when said switching arrangement exhibits said first state; and a plurality of switches, each coupled to a respective one of said attenuators and to said microphone means, and each having a first condition for by-passing said respective attenuator such that signals reproduced by a respective head are supplied to a respective amplifier without passing through said attenuator when said switching arrangement exhibits said first state and a second condition for effectively connecting said respective attenuator in said series circuit and also for connecting said microphone means to said respective amplifier.

19. The apparatus of claim 18, further comprising a actuator selectively operable to dispose said plurality of switches in said second condition and concurrently dispose said switching arrangement in said second state.

20. The apparatus of claim 18 wherein each of said attenuators comprises a resistive voltage divider having a first resistance connected in said series circuit and a second resistance connectable in shunt relationship with the input of a respective one of said amplifiers; and wherein each of said switches comprises a movable contact connected in parallel, short-circuit relationship with said first resistance when said switch exhibits said first condition and connected between said input of said respective amplifier and said second resistance whe said switch exhibits said second condition.

21. The apparatus of claim 20 wherein said movable contact of each switch also connects said microphone means to said input of said respective amplifier when said switch exhibits said second condition.

22. Apparatus for reproducing signals from a record medium, comprising transducer means for reproducing said signals; head-phone jack means for receiving said reproduced signals and, when head-phone means are connected thereto, for supplying said reproduced signals to said head-phone means to enable a listener to listen to said reproduced signals; microphone means for producing audio electrical signals; switch means selectively operative to facilitate conversation between said listener and another, said switch means having a first condition, whereby said reproduced signals are supplied to said head-phone jack means substantially in the absence of said audio electrical signals, and a second condition, whereby both said audio electrical signals and attenuated reproduced signals are supplied concurrently to said head-phone jack means; and means responsive to the operation of said switch means to provide attenuation of said reproduced signals supplied to said head-phone jack means when said switch means has said second condition relative to the reproduced signals supplied to said head-phone jack means when said switch means has said first condition, whereby the listener hears said reproduced signals as background for said audio electrical signals when said switch means is in said second condition.

* * * * *